March 15, 1960 R. H. ALLEN 2,928,909

TELEPHONE GUARD

Filed Aug. 5, 1958

INVENTOR.

RAYNOR H. ALLEN

BY John R. Walker, III

Attorney

United States Patent Office 2,928,909

Patented Mar. 15, 1960

2,928,909

TELEPHONE GUARD

Raynor H. Allen, Memphis, Tenn.

Application August 5, 1958, Serial No. 753,255

7 Claims. (Cl. 179—147)

This invention relates to a telephone guard and, more particularly, to a device for selectively preventing and permitting removal of the handset of a telephone.

As is commonly known, small children have the habit of playing with a telephone. Many times they pick up the handset when their parents are not around and play with the dial on the phone, thereby annoying persons who are accidentally dialed and tying up the phone for long periods of time.

Thus, one of the objects of this invention is to provide a device which is adapted to be used in conjunction with a telephone so that the parent or other person of discretion may place the telephone in a condition in which the handset cannot be removed by a small child, or accidentally removed as by pets, etc., pulling on the handset cord.

A further object is to provide such a device which may be quickly actuated to render the telephone in a condition for use at the will of the parent or other person of discretion.

A further object is to provide means for locking a telephone against undesired use.

A further object is to provide a device for selectively preventing and permitting removal of the handset of a telephone comprising a stand including an overhanging ledge, a platform adapted to support the telephone thereon, said platform being slidably mounted from said stand for movement between a forward position and a rearward position, when in said rearward position said platform being positioned to support the telephone with the handset thereof under said ledge whereby the ledge prevents upward removal of the handset, and when in said forward position said platform being positioned to support the telephone with the handset thereof out from under said ledge whereby permitting removal of the handset.

Other and further objects and advantages of the invention will be hereinafter set forth and the novel features thereof defined in the appended claims.

Figures 1, 2, 3, 4, 5, 6:
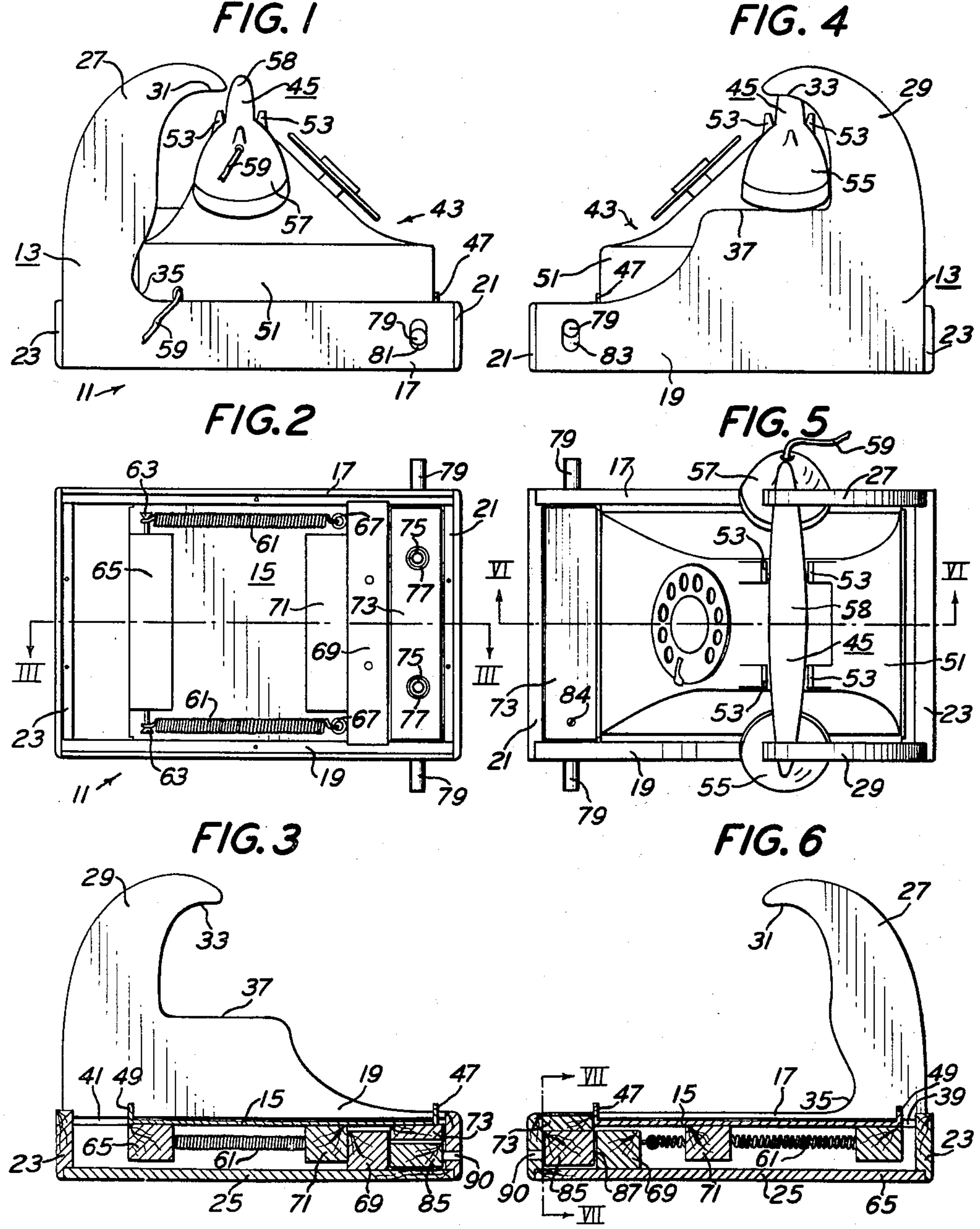
Fig. 1 is a side elevational view of the guard of the present invention with a telephone being shown in conjunction therewith and with the platform in a forward position to permit removal of the handset of the telephone.
Fig. 2 is a bottom view of the guard of the present invention with the bottom cover removed therefrom and with the platform being shown in a forward position.
Fig. 3 is a sectional view taken as on the line III—III of Fig. 2, with the telephone removed from the guard and with the bottom cover replaced.
Fig. 4 is a view similar to Fig. 1 but as viewed from the opposite side thereof and with the platform being disposed in a rearward position to prevent removal of the handset of the telephone.
Fig. 5 is a top-plan view of the guard of the present invention shown with a telephone in position thereon and with the platform in the rearward position.
Fig. 6 is a sectional view taken as on the line VI—VI of Fig. 5 and with the telephone removed from the guard.

Referring now to the drawing in which the various parts are indicated by numerals, the telephone guard 11 of the present invention comprises, in general, a stand 13 and a substantially horizontal platform 15 slidably mounted from stand 13 for forward and rearward movement relative thereto.

Referring now, more specifically, to stand 13, the stand is preferably, though not necessarily, formed of wood and includes a pair of spaced and parallel sides 17, 19, a pair of spaced and parallel end members 21, 23 respectively joining the opposite ends of sides 17, 19, and a bottom cover 25 removably attached adjacent the lower edges of the sides and end members as by screws or the like. A pair of laterally-spaced arms 27, 29 extend upwardly from sides 17, 19 respectively adjacent the rearward ends thereof with the arms 27, 29 being preferably formed integrally with the respective sides 17, 19. The upper ends of arms 27, 29 project forwardly to form overhanging ledges 31, 33 respectively. Arm 27 is cut out as at 35 adjacent side 17 and arm 29 projects forwardly below ledge 33 to form a substantially horizontal shelf 37 spaced below ledge 33, the purposes of cut out 35 and shelf 37 being more apparent in the description to follow.

Platform 15 is spaced above bottom cover 25 and the side edges thereof are respectively slidably received in horizontally-extending grooves 39, 41 respectively formed in the inner faces of sides 17, 19 whereby platform 15 is adapted to slide between a first or forward position, best shown in Fig. 3, and a second or rearward position, best shown in Fig. 6. Platform 15 is adapted to support a telephone 43 thereon with the receiver 45 thereof extending transversely of stand 13 and beyond the opposite sides thereof in the manner best shown in Figs. 1, 4, and 5. Transversely-extending flanges 47, 49 are respectively provided at the forward and rearward edges of platform 15 and extend upwardly therefrom to prevent rearward and forward movement of telephone 43 relative to the platform. Telephone 43 is the well-known type which includes a base 51 upon which rests the handset 45 in a cradle formed by projections 53 when the telephone is not in use, with the handset being adapted to be lifted upwardly from the cradle to remove the handset for use. Handset 45 includes the usual mouthpiece 55 and ear piece 57 connected by a handle 58.

Guard 11 is arranged so that when platform 15 is disposed in said rearward position handset 45 is disposed beneath ledges 31, 33, in close adjacency thereto, to prevent upward removal of the handset. Also, when platform 15 is in said rearward position, the bottom of mouthpiece 55 is disposed over shelf 37 in close adjacency thereto, whereby preventing substantial tilt of handset 45 relative to base 51 to insure positively that handset 45 may not be tilted and removed through the space provided between projections 53 and ledges 31, 33. Thus, it will be seen ledges 31, 33 prevent upward removal of handset 45 and shelf 37 eliminates any possibility of removal of the handset even at an angle.

When platform 15 is in said forward position, as best seen in Fig. 1, the handset 45 is out from under ledges 31, 33 whereby the handset is unobstructed and may be removed. It will be apparent that cut out 35 provides room for the handset cord 59, where it enters base 51, to move rearwardly when platform 15 is moved to said rearward position.

Means is provided for biasing platform 15 to said forward position, which means preferably, though not necessarily, includes a pair of tension springs 61, each of which is attached as by a stud 63 or other attachment means to one end of a block 65 which, in turn, is fixedly mounted from the bottom of platform 15 adjacent the rearward end thereof. The other end of each of springs 61 is attached as by an eye bolt 67 or the like to a transverse member 69 which is fixedly disposed transversely of stand 13 between sides 17, 19 adjacent the forward part of the stand and spaced from forward end member 21 in parallel relationship thereto.

A stop 71 is fixedly mounted from the bottom of platform 15 intermediate the ends thereof and adapted to limit forward movement of platform 15 to stop the platform in said forward position, as best shown in Figs. 2 and 3.

Blocking means is provided for selectively holding platform 15 in said rearward position and releasing the platform for forward travel to said forward position. Said blocking means preferably comprises an elongated block-like member 73 extending transversely of stand 13 in the space between transverse member 69 and forward end 21 with the block-like member being loosely mounted therein for vertical movement. Said blocking means additionally comprises means to urge the blocking means upwardly, which urging means preferably comprises a pair of compression springs 75 disposed in spaced relationship intermediate the ends of block-like member 73 and between the block-like member and bottom cover 25. The upper ends of springs 75 are preferably set in sockets 77 formed in the bottom of block-like member 73. Said blocking means also comprises a pair of rods 79 fixedly mounted from opposite ends of block-like member 73 and outwardly extending therefrom beyond sides 17, 19 through slots 81, 83 respectively provided in sides 17, 19. One of rods 79 is preferably mounted for removal from block-like member 73 for ease of assembly of said blocking means with stand 13. This removable mounting preferably includes a socket, not shown, into which the rod is inserted and held therein as by a set-screw 84.

The upward travel of said blocking means is limited by engagement of rods 79 with the portions of sides 17, 19 adjacent the upper ends of slots 81, 83 to stop the blocking means in an upward position, best shown in Figs. 4, 5 and 6. When said blocking means is in said upward position, block-like member 73 is disposed between the forward end of platform 15 and the rearward face of end member 21 to hold the platform in said rearward position. Said blocking means is movable downwardly by pressure on rods 79 to move block-like member 73 downwardly past the end of platform 15 below the level thereof whereupon the platform being unobstructed will move to said forward position under influence of tension springs 61. Subsequent release of pressure on rods 79 will permit block-like member 73 to assume the position best shown in Fig. 3, wherein it will be seen the block-like member is in contact with the bottom of platform 15.

With telephone 43 in place on guard 11, as best shown in Fig. 1, the device is placed in a condition in which handset 45 is prevented from being removed from the telephone by pushing rearwardly against base 51 to carry platform 15 rearwardly until the platform moves out of the way of block-like member 73, at which time the block-like member moves upwardly under influence of springs 75 to hold the platform with the telephone thereon in said rearward position, as heretofore described, in which position handset 45 cannot be removed from the telephone. When it is desired to place the device in a condition in which handset 45 may be removed for the use of the telephone, downward pressure is exerted simultaneously on rods 79 to urge block member 73 straight downward out of the path of platform 15 so that the platform may again move forwardly to said forward position. It should be pointed out that one of the features of the present invention is the necessity for downward movement on both of rods 79, thus making the device inoperable by a small child. The child, not knowing how to operate the device, would push downward on only one of rods 79 at a time which would tilt block-like member 73, in which case a portion of the block-like member would still hold the platform 15 rearwardly.

Figure 7:
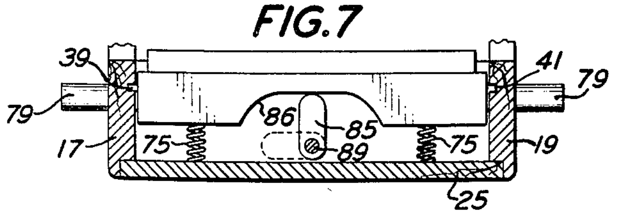
Fig. 7 is an enlarged fragmentary sectional view taken as on the line VII—VII of Fig. 6.

Locking means is preferably, though not necessarily, provided for locking block-like member 73 in said upward position. Said locking means preferably comprises an oblong-shaped locking piece 85 which is rotatably mounted for rotation between an upright position best shown in Figs. 6 and 7, and a horizontal position best shown in Fig. 3 and in broken lines in Fig. 7. A cut-out portion 86 is provided in the lower edge of block-like member 73 so that the movement of the block-like member to a downward position is unobstructed by piece 85 when the piece is in said horizontal position. Oblong piece 85 is supported adjacent the rearward part thereof as by a pin 87 rotatably mounted from transverse member 69 and is supported adjacent the forward part thereof by a shaft 89 which is fixedly mounted on the rotating member of a lock 90. Lock 90 is of well-known construction and it is not deemed necessary to describe the details thereof other than to say that it is of the usual type having a rotatable member which is rotated between a locked and an unlocked position by means of a key inserted therein.

With block-like member 73 in said upward position, to operate said locking means the key is inserted in lock 90 and the lock rotated to carry oblong piece 85 in said upstanding position to lock block-like member 73 in said upward position. To unlock said locking means, the reverse of the herein-described locking procedure is accomplished by rotating the key to carry the oblong piece 85 into said horizontal position, whereby permitting downward movement of block-like member 73, so that the device may be operated in the manner heretofore described.

It will be understood that said locking means is particularly useful when it is desired to prevent undesired use of a telephone during a person's absence, but it will also be understood that the locking means will not be needed in most cases and may be omitted from the device without affecting the operation of the principal features of the device of the present invention. When said locking means is omitted, cut-out portion 86 is preferably omitted.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A device for selectively preventing and permitting removal of the handset of a telephone comprising a stand including an overhanging ledge and a substantially horizontal shelf spaced below the ledge, a platform adapted to support the telephone thereon, said platform being slidably mounted from said stand for forward and rearward movement relative thereto, means to bias said platform to a forward position for movement by hand to a rearward position, when in said rearward position said platform being positioned to support the telephone with the handset thereof between said ledge and said shelf thereby preventing the removal thereof, blocking means disposed adjacent the forward end of said platform, said blocking means including a pair of rods respectively disposed at opposite ends of the blocking means, means to urge said blocking means to an upward position, when in said upward position said blocking means being positioned between the forward end of said platform and said stand to hold the platform in said rearward position thereby preventing removal of the handset, said blocking means being movable downwardly below the level of said platform by downward pressure on said rods to permit forward movement of said platform to said forward position under influence of said biasing means, when in said forward position said platform being positioned to support the telephone with the handset thereof out from between said ledge and said shelf thereby permitting removal of the handset.

2. The structure according to claim 1 including a locking means comprising a locking piece rotatably mounted from said stand beneath said blocking means, a lock connected to said locking piece for rotation of the locking piece between a substantially upright position and a substantially horizontal position, when in said upright position said locking piece contacting said blocking means to hold the blocking means in said upward position, and when in said horizontal position said locking piece permitting downward movement of said blocking means.

3. A device for selectively preventing and permitting removal of the handset of a telephone comprising a stand including an overhanging ledge, a platform adapted to support the telephone thereon, said platform being slidably mounted from said stand for forward and rearward movement relative thereto, means to bias said platform to a forward position for movement by hand to a rearward position, when in said rearward position said platform being positioned to support the telephone with the handset thereof under said ledge thereby preventing the upward removal thereof, blocking means disposed adjacent the forward end of said platform, said blocking means including a pair of rods respectively disposed at opposite ends of the blocking means, means to urge said blocking means to an upward position, when in said upward position said blocking means being positioned between the forward end of said platform and said stand to hold the platform in said rearward position thereby preventing removal of the handset, said blocking means being movable downwardly below the level of said platform by downward pressure on said rods to permit forward movement of said platform to said forward position under influence of said biasing means, when in said forward position said platform being positioned to support the telephone with the handset thereof out from under said ledge thereby permitting removal of the handset.

4. The structure according to claim 3 including locking means for selectively locking said blocking means in said upward position and unlocking said blocking means to permit downward movement thereof.

5. A device for selectively preventing and permitting removal of the handset of a telephone comprising a stand including an overhanging ledge, a platform adapted to support the telephone thereon, said platform being slidably mounted from said stand for forward and rearward movement relative thereto, means to bias said platform to a forward position for movement by hand to a rearward position, blocking means movable into and out of disposition in which the blocking means holds said platform in said rearward position whereby said platform is adapted to be selectively held in said rearward position and released for movement to said forward position under influence of said biasing means, when in said rearward position said platform being positioned to support the telephone with the handset thereof under said ledge thereby preventing the upward removal thereof, when in said forward position said platform being positioned to support the telephone with the handset thereof out from under said ledge thereby permitting removal of the handset.

6. A device for selectively preventing and permitting removal of the handset of a telephone comprising a stand including an overhanging ledge, a platform adapted to support the telephone thereon, said platform being slidably mounted from said stand for movement between a first position and a second position, when in said first position said platform being positioned to support the telephone with the handset thereof under said ledge whereby the ledge prevents upward removal of the handset, and when in said second position said platform being positioned to support the telephone with the handset thereof out from under said ledge thereby permitting removal of the handset.

7. The combination with a telephone, provided with a base and a handset removably received thereon, of a guard for selectively preventing and permitting removal of said handset, comprising a stand including an overhanging ledge and a substantially horizontal shelf spaced below the ledge, a platform slidably mounted from said stand for forward and rearward movement relative thereto, said telephone being supported by said platform for movement therewith, means to bias said platform to a forward position for movement to a rearward position by rearward pressure on said telephone, when in said rearward position said platform supporting said telephone with said handset between said ledge and said shelf thereby preventing the removal of the handset, blocking means disposed adjacent the forward end of said platform, said blocking means including a pair of rods disposed at opposite ends of the blocking means, means to urge said blocking means to an upward position, when in said upward position said blocking means being positioned between the forward end of said platform and said stand to hold the platform in said rearward position thereby preventing removal of said handset, said blocking means being movable downwardly below the level of said platform by downward pressure on said rods to permit forward movement of said platform under influence of said biasing means to said forward position carrying with it said telephone, when in said forward position said platform supporting said telephone with said handset being out from between said ledge and said shelf whereby permitting removal of the handset.

References Cited in the file of this patent

UNITED STATES PATENTS

| | | |
|---|---|---|
| D. 133,117 | Mathieson | July 21, 1942 |
| 1,809,125 | Hoyt | June 9, 1931 |
| 2,835,745 | Romano | May 20, 1958 |